April 2, 1940.  J. G. BLUNT  2,196,007
RAILWAY VEHICLE
Filed Dec. 10, 1938   4 Sheets-Sheet 1
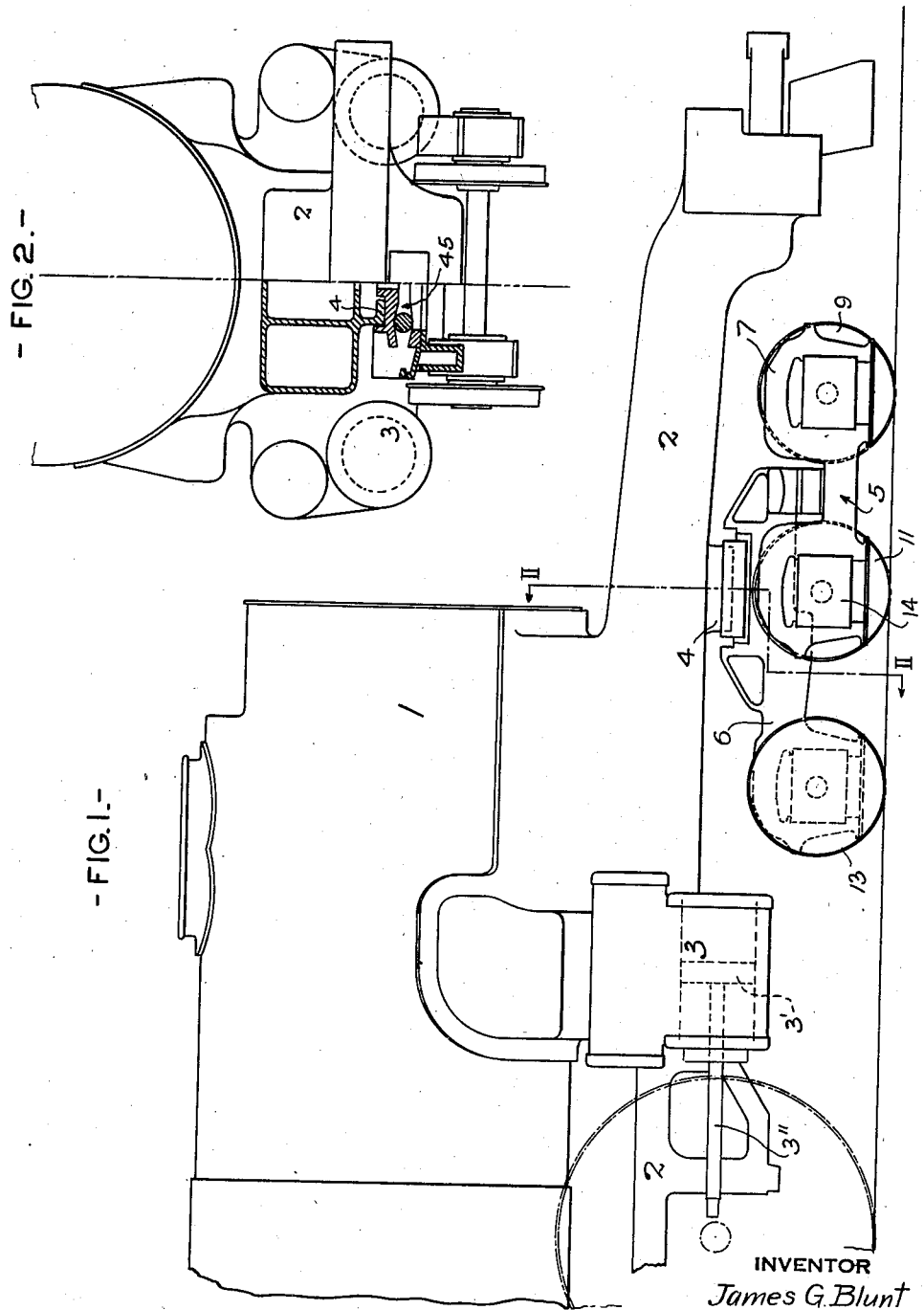
INVENTOR
James G. Blunt
BY S. C. Yeaton
ATTORNEY

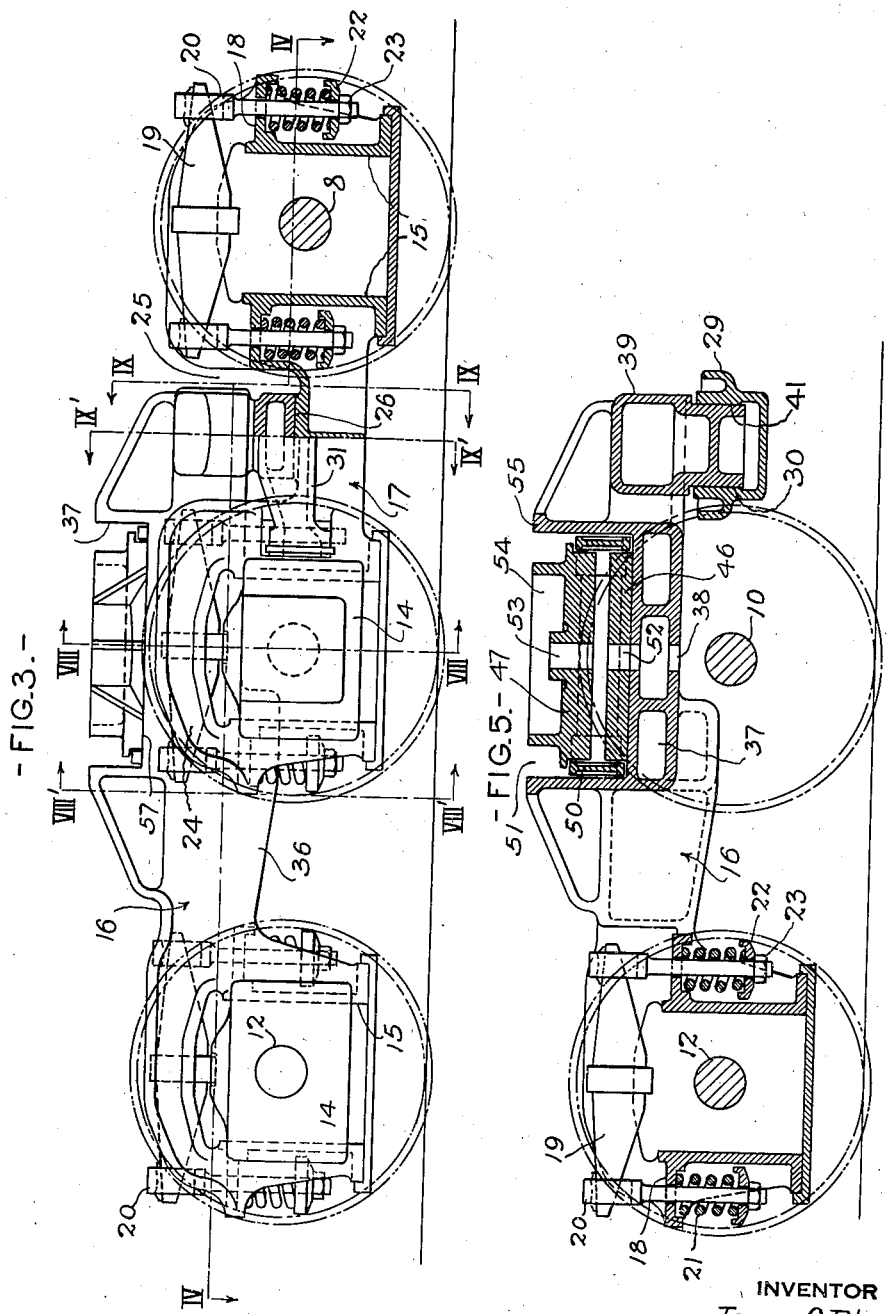

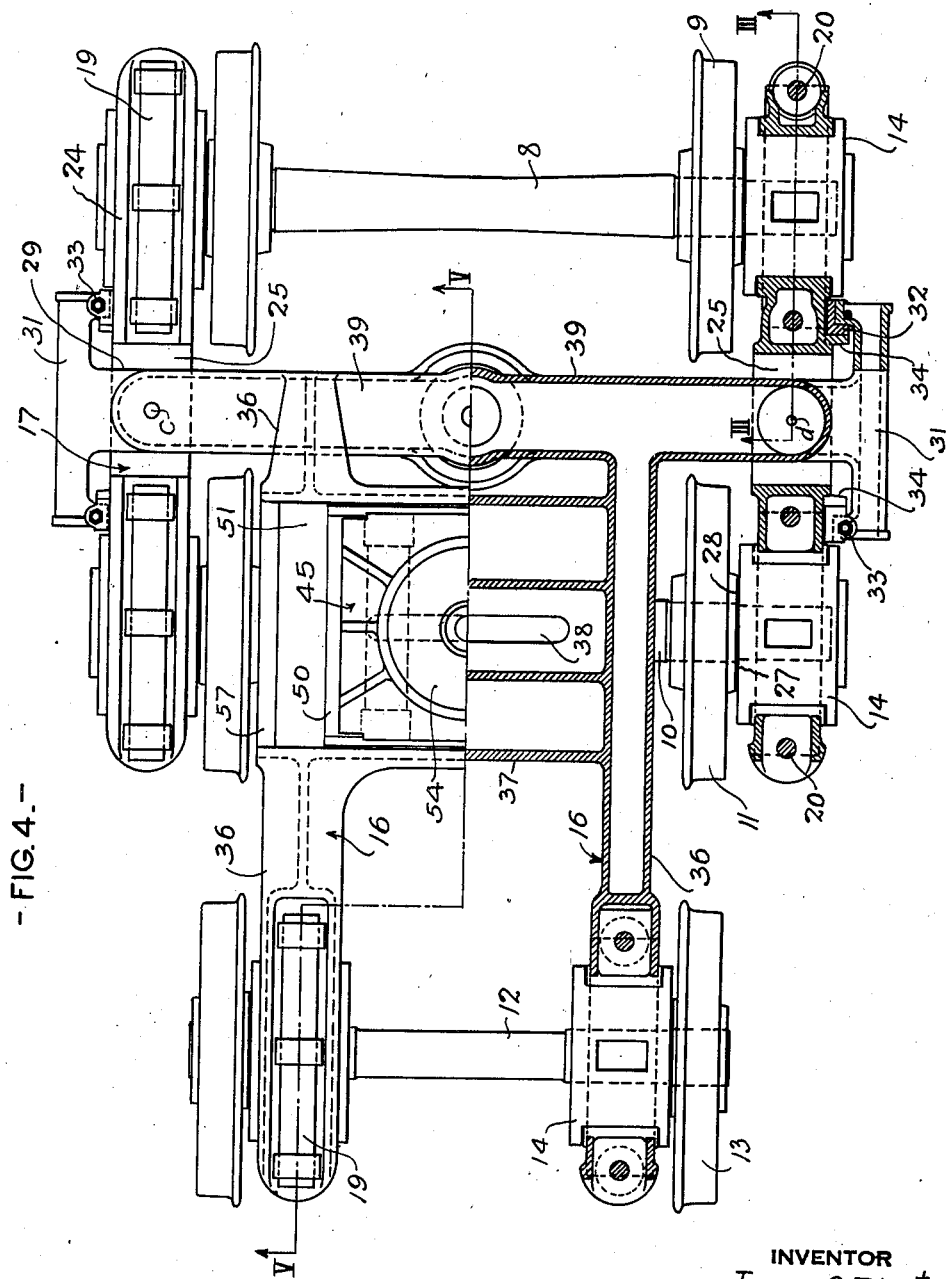

April 2, 1940.    J. G. BLUNT    2,196,007
RAILWAY VEHICLE
Filed Dec. 10, 1938    4 Sheets-Sheet 4
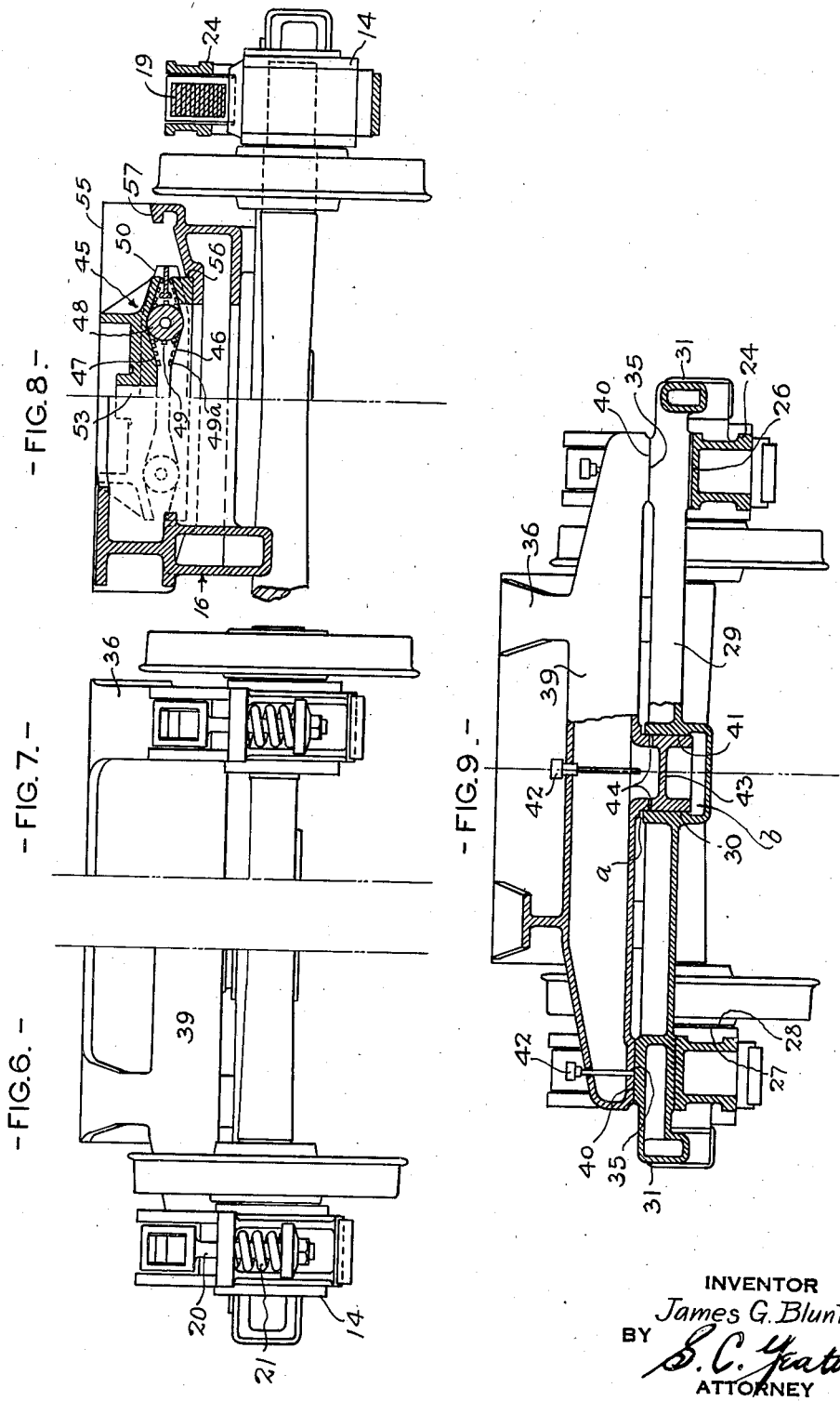
INVENTOR
James G. Blunt
BY
S. C. Yeaton
ATTORNEY Patented Apr. 2, 1940

2,196,007

UNITED STATES PATENT OFFICE 2,196,007

RAILWAY VEHICLE

James G. Blunt, Schenectady, N. Y., assignor to American Locomotive Company, New York, N. Y., a corporation of New York Application December 10, 1938, Serial No. 244,886

6 Claims. (Cl. 105—37)

This invention relates to railway vehicles, and more particularly to trucks therefor of a type especially adapted for employment as the leading truck of a steam locomotive.

An object of the invention is to provide a six-wheel leading truck for a locomotive.

Another object of the invention is to provide a multi-axle truck for a steam locomotive having side power cylinders, the wheeled axle of the truck adjacent the end of the cylinders remote from the piston rod being of the inside journal type to provide sufficient clear space at these ends of the cylinders to permit the cylinder heads at these ends to be removed and the pistons and piston rods to be removed through these ends, the truck having an axle with outside journal boxes in line with the respective cylinders, the axle being disposed relative to the cylinders so as not to interfere with the removal of the aforementioned parts, to lend stability in supporting the superstructure.

Another object is to provide, in a truck having inside and outside journal bearings, truck sections having separate frames, one of the frames being supported on a plurality of wheeled axles and the other frame being supported at one end upon a wheeled axle, supporting weight of the superstructure, and having connection with the first mentioned frame for transmitting thereto part of the supported weight of the superstructure, the frames being pivotally connected for lateral radial relative movement.

Another object of the invention is to provide, in a truck of the sectional type, a pivotal connection connecting the separate frames but supporting none of the load of the superstructure, and means at each side of and spaced from the pivotal connection connecting the section having the one wheeled axle with the other section for support by said other section while leaving the sections free for the lateral radial relative movement about the pivotal connection.

Other objects of and advantages achieved by the present invention will be apparent from the following description thereof and the claims appended hereto.

In the accompanying drawings illustrating the preferred embodiment of the invention, Figure 1 is a diagrammatic side elevation of the front end of a locomotive embodying the present invention; Fig. 2, at the right, is a diagrammatic half front end elevation of the locomotive, with parts removed, and at the left, a half section on the line II—II of Fig. 1, the upper portion of the locomotive being broken away; Fig. 3 is an enlarged part side elevation and part section on the line III—III of Fig. 4, certain parts being removed and other parts being shown in dot and dash lines, of the truck of the present invention; Fig. 4 is a part plan view and a part section on the line IV—IV of Fig. 3; Fig. 5 is a section on the line V—V of Fig. 4, certain parts being shown in full, other parts removed, and others parts being shown in dot and dash lines; Fig. 6 is a half front end view of the truck as viewed in Fig. 1; Fig. 7 is a half rear view of the truck; Fig. 8, at the right, is a half section on the line VIII—VIII, certain parts being shown in full, and at the left, a fragmental half section on the line VIII'—VIII', of Fig. 3; and Fig. 9, at the right, is a half section on the line IX—IX, parts being broken away, and at the left a half section on the line IX'—IX' of Fig. 3.

The locomotive is indicated generally by the reference numeral 1. It may be of a conventional design and will require no description except as to the parts bearing on the present invention, and although the truck of the present invention has special application as a leading truck for a steam locomotive, it will be understood that it may be otherwise employed where appropriate in railway vehicles. In the present instance the front end of a 6-4-4-6 Mallet locomotive is shown. The great weight of the superstructure of such a locomotive and of other modern high speed locomotives makes it advisable to employ a six-wheel leading truck.

The locomotive comprises a main frame 2 and a power cylinder 3 provided with a piston 3' and a piston rod 3", located at each side thereof toward the front of the locomotive in the usual manner. These parts, and the boiler, are included in the term "superstructure" as employed herein, together with the other parts usually included in the superstructure. A center pin 4 for connection with the leading truck of the locomotive depends from the frame 2 at a sufficient distance in advance of the power cylinders to prevent interference of the rear part of the truck with the power cylinders when passing through curved track.

The truck of the present invention is indicated generally by the reference numeral 5. It comprises two sections, indicated generally by the reference numerals 6 and 7 respectively. The section 7 comprises a forward axle 8 having wheels 9 and a rear axle 10 having wheels 11, and resembles in effect an equalized four-wheel truck as will later more fully appear. The section 6, which is conveniently termed a main section for the reason that it initially supports the load of the superstructure, has an axle 12 having wheels 13, this axle 12 being disposed near the rear end of the section 6. For convenience the terms "front" and "rear" are employed as this is appropriate in the present instance where the truck is employed as a leading truck for a steam locomotive, but it will be understood that in other locations the truck may be turned end for end, making the rear end of the truck the front end and the front end the rear end. However, in the present instance the truck will be described in its application as a leading truck.

The truck is provided throughout with conventional journal boxes 14 housed for vertical movement in pedestals 15. These parts are shown similar in each instance and the boxes may be either of the frictional or anti-frictional bearing type, as desired. Either Timken or SKF bearings may be used if the boxes are of the antifrictional type.

The axle 12 has inside journals and the axles 8 and 10 have outside journals. The outside journals give the truck sufficient width to provide ample stability for the support of the superstructure of the locomotive carried thereby, the outside journal boxes extending laterally to an extent to bring them into line with the power cylinders 3. This is the preferable construction although one of the axles of section 7 may be of the inside journal type where appropriate. By making the axle 12 of the inside journal type and suitably disposing the frame supporting the inside boxes for a sufficient length thereof within the space between the planes of the wheels of this axle, the transverse over-all dimension of the rear portion of the section 6 is kept within the bounds of the power cylinders 3, that is to say a clear space is provided ahead of the power cylinders so that the front cylinder heads may be removed and the pistons and piston rods removed through the front end of the cylinders for repair and replacement of the piston rings, etc. This association with the power cylinders of a truck having this type of axle and frame, in combination with an axle of the outside journal box type, is a feature of the present invention. Broadly considered, a truck having these characteristics may comprise either two, three, or a larger number of axles, the requirement being that the axle of the inside journal box type is so disposed adjacent the cylinder heads remote from the piston rod as to prevent the removal of the parts mentioned were it of the outside journal box type, and furthermore that the axle or axles, as the case may be, having outside journal boxes which are in line with the cylinders, are so disposed relative to the cylinders (which may be either forward or rearward of the cylinders) as not to interfere with the removal of the above mentioned parts.

While the truck brake rigging is not shown, as it forms no part of the present invention, it will be understood that any preferred or well-known type may be employed.

The frame of the truck section 6 is indicated generally by the reference numeral 16 and that of the section 7 by the reference numeral 17. The frames 16 and 17 are doubly spring-supported from each of the boxes in a similar manner, as shown in Fig. 3. Therefore a description of one of these spring supports will suffice.

The truck frames are formed of parts generally box-shape in cross section, providing at each side of each pedestal an orificed horizontal web 18. Each journal box 14 has supported thereupon a longitudinally extending semi-elliptic spring 19, which is disposed between the side walls of the adjacent frame member and from each end of which depends a hanger 20 which passes through the orifice in the adjacent web 18 and has mounted thereon beneath the web a coil spring 21 in supporting engagement therewith. Beneath the spring, mounted upon the hanger, is a seat 22 for supporting the spring 21, which is held in place by a nut 23 screwed upon the end of the hanger. A single coil spring is shown, but a double coil spring, or other type of yielding device, may be used if desired. A double spring support is thus provided for the frame at each of the boxes. The superstructure is thus borne by separate spring supports instead of the equalizing spring rigging commonly employed, and therefore all equalizers, equalizer pins, hangers and bolted fastenings are eliminated. The frame 16 serves as an equalizer of the load supported by the truck as will later more fully appear.

The frame 17 comprises separate side frame members 24, disposed outside of the wheels, in which the boxes 14 of the axles 8 and 10 are housed with a working fit to provide for vertical relative movement between the side frame members and boxes but no lateral relative movement therebetween. The side members midway between the axles 8 and 10 are each provided with a pocket 25, the bottom of which provides a seat 26. The journal boxes have, at their inner faces 27, a working fit with the outer faces of the hubs 28 of the adjacent wheels. A bolster 29, having a centrally disposed pin socket 30, is housed at its end portions in the pockets 25, these portions being supported by the seats 26.

At the outer faces of the side members the bolster is formed at each end with a cross member 31, extending longitudinally of the truck, having end portions spaced laterally somewhat beyond and extending downwardly opposite the adjacent outer faces of the side members. Each of these spaces is filled with a shoe 32 bolted to the cross member by a bolt 33 and making a working fit with the face of the adjacent side member, thereby preventing transverse movement of the bolster relative to the side members, the side members being provided with lugs 34 making a working fit with an adjacent shoe. The lugs 34 of a side member are disposed between the shoes, thereby cooperating to prevent longitudinal movement of the bolster relative to the side members.

The frame 17 is simple in construction, durable and cheap in maintenance. The working fit between the side frame members and bolster shoes, and journal boxes and between the journal boxes and the wheel hubs provides, with the bolster, the degree of rigidity required of a truck frame. The truck section 7 is, however, sufficiently flexible, due to its construction and the working clearances provided, and the truck section 6 is also sufficiently flexible, to compensate for track irregularities.

The bolster is provided with finished seats 35 directly over the side frame members.

The frame 16, unlike the frame 17, is a rigid structure, preferably a unitary casting, comprising side members 36 in which the boxes 14 of the axle 12 are housed, and a unitary cross member 37 provided with a transversely extending slot 38 for a purpose later to be mentioned. The side members 36 extend forwardly beyond the cross member 37 and have integrally formed therewith a transverse member 39. The member 39 extends to the side frame members 24 and is provided with finished bosses 40 which engage the finished seats 35. A pin 41 is integrally formed on the transverse member 39 at the center thereof, and extends into the socket 30. Lubricant containers 42 are provided in the transverse member 39 for lubricating the seats 35 and the cylindrical socket 30, the pin being hollow and provided with a transverse wall 43 and orifices 44 to enable the feeding of the lubricant to the cylindrical wall of the socket.

The pin 41-socket 30 connection provides for lateral radial relative movement between the sections 6 and 7 to permit the truck to pass through curved track with maximum ease as to wheel flange stresses, the rigid wheel base, due to this articulation, being relatively short. During this lateral radial relative movement the bosses 40 slide upon the lubricated seats 35 and the pin 41 turns within the lubricated socket 30.

In the preferred construction the bolster 29 bears none of the weight of the load at its central position, as will be clearly seen by an inspection of Fig. 9 where clearances $a$ and $b$ are provided between adjacent horizontal faces of the pin and socket. The pin 41-socket 30 connection does however take all the lateral thrust between the two frames. The weight of the load borne by the section 7 is received by the bolster upon the seats 35 being transmitted thereto from the transverse member 39 which rides upon the bolster. This weight is transmitted from the bolster to the side frame members 24; these members directly support the entire weight transmitted to the section 7. This feature of the pin 41 serving only as a pivot pin, is a feature of the present invention. It is not intended to confine this feature to any particular construction of truck, as it has broad application. This feature enables the various associated parts to be made lighter and provides for a transmission of the load directly to the parts best suited, namely the side frame members to which the load is vertically transmitted. However, when desired, the truck may be designed for supporting some of the load at the pin connection.

The pin 41 is in the longitudinal vertical central plane of the truck and is midway between the axles 8 and 10 so that the section 7 uniformly turns about the pin connection, and as the seats 35, when the truck is on tangent track, are in transverse alignment with the pin 41, the load transmitted to the section 7 during such times is transmitted equally to the four wheels of the axles 8 and 10.

A lateral motion resisting and centering device, indicated generally by the reference numeral 45, is interposed between the superstructure of the locomotive and the frame 16. Any appropriate type of lateral motion device may be employed. In the present instance however, a device somewhat similar to that shown in my United States Patent No. 1,482,109, issued January 29, 1924, has been chosen. For a full understanding of the main features of the device reference may be had to this patent. Only sufficient of the device is shown and described in the present instance to clearly understand its adaptation to the present invention.

The device comprises a lower roller seat 46 and an upper roller seat 47, best shown in Figs. 5 and 8. The seats are provided with the usual inclined faces to provide for the desired amount of resisting and centering action. Between the seats are rollers 48 provided at their ends with gear wheels 49 which mesh with toothed racks 49a which are carried by the seats in the usual manner. The rollers are journalled in the usual yoke 50.

The frame 16 is provided with a chamber 51 in which the device is housed for relative transverse movement between the seats and appropriate rolling of the rollers as the superstructure and truck move relatively in a transverse direction. The lower seat rests upon the bottom of the chamber and is provided with a slot 52 which registers with and is of equal length to the transverse slot 38 formed in the frame, this length being sufficient for maximum lateral movement. The bottom of the chamber 51 is close to the axle 10, thereby keeping the center bearing point as low as possible. The upper seat is provided with an orifice 53 registering with the slots 52 and 38 for the reception of a pin or bolt (not shown), the lower end of which passes through the slots for holding the parts together while permitting their relative movement, the pin moving through the slots during such movement, all in the usual manner.

The upper seat is provided with a center plate 54 in which seats the center pin 4 (see Fig. 2). When on tangent track, the center plate 54 is disposed with its center directly above the axis of the axle 10 and in the longitudinal vertical center plane of the truck. Means is thus provided, including the center pin-center plate-lateral motion device construction, for transmitting weight of the load of the superstructure to the truck; to permit lateral radial movement between the superstructure and truck; to provide yielding resistance to lateral displacement movement between the superstructure and truck, especially when entering and leaving curved track; and for aiding in centering the superstructure and truck after such movement, as for instance when entering tangent track. These, however, are the usual functions of such a structure. While the resistance device of the preferred embodiment is disposed between the truck and the center bearing, it may, if desired, with appropriate obvious changes, be disposed between the superstructure and the center bearing.

In the preferred construction, when the truck is on tangent track, the centers of the supports, indicated at $c$ and $d$, of the side frame members 24 for the frame 16, are midway between the axes of the axles 8 and 10, as previously remarked, and in similar manner the distance between the axis of the center plate 54 and the axis of the socket 30 is one-half that between the axis of the axles 8 and 10. The distance between the axis of the center plate 54 and the axis of the axle 12 is twice this distance, i. e., is equal to the distance between the axes of the axles 8 and 10. By this arrangement the axle 12 supports one-third of the weight of the load of the superstructure supported by the truck. The remaining two-thirds of the weight is transmitted to the side frame members 24 and each axle 8 and 10 supports one-half of this two-thirds of the weight. Therefore each axle of the truck supports one-third of the weight of the load transmitted to the truck. The frame 16 thus serves as an equalizer of this weight, thereby also equalizing the wheel flange pressure of all six wheels. By suitably proportioning these distances the weight of the superstructure carried by the truck may be distributed between the axles of the truck in any desired manner. The truck, in its preferred embodiment, has, as shown, but three axles, but it will be understood that other axles may be added in appropriate cases if desired.

The chamber 51 has relatively high transverse walls 55 which make a working fit with the yoke 50 permitting free movement of the yoke with the rollers relative thereto when the superstructure and truck move transversely relative to each other. The chamber 51 has relatively low longitudinal shoulders 56 between which the lower seat snugly fits and which serve to prevent transverse movement of this seat relative to the truck. This seat may be otherwise secured to the truck in any desired manner. Spaced outwardly beyond the shoulders 56 are walls 57 which are sufficiently high to abut the approaching end of the yoke 50 during the relative lateral movement between the seats. Any appropriate means for limiting the lateral displacement movement may be employed instead of the walls 57. The relative lateral movement provided is sufficient to permit the superstructure and truck to move laterally relative to each other when passing through any curved track, but it is so limited as to keep the center plate 54 well within the limits of the four-point support of the frame 16, that is to say within the defining lines drawn from the points c and d to the centers of the bearings of the axle 12 at the same side of the truck as the respective points c and d. This insures stable support for the center pin 4 and consequently the superstructure above the supporting truck, also eliminating any tilting tendency of the bolster. This construction also provides for a wide range of lateral movement of the center plate without overloading the framework of the truck when extreme lateral movement of the center plate occurs.

While there has been hereinbefore described an approved embodiment of this invention, it will be understood that many and various changes and modifications in form, arrangement of parts and details of construction thereof may be made without departing from the spirit of the invention and that all such changes and modifications as fall within the scope of the appended claims are contemplated as a part of this invention.

The invention claimed and desired to be secured by Letters Patent is:

1. A locomotive comprising power cylinders at each side thereof having pistons and piston rods; and a truck, supporting weight of the locomotive superstructure, having a framing, a wheeled axle with inside journals adjacent the ends of said cylinders remote from said piston rods, said framing adjacent the wheels of said axle being disposed within the space between the planes of the outer faces of said wheels, and housing said journals, to provide sufficient clear space at said ends of said cylinders to permit the cylinder heads at said ends to be removed and the pistons to be removed through said ends, and another wheeled axle with outside journals, said framing extending laterally outwardly beyond said wheels of said outside journal axle, housing said outside journals, and in line with said cylinders, said outside journal axle being disposed relative to said cylinders so that said extending frame will not interfere with the removal of said cylinder heads and said pistons.

2. In a locomotive, a truck comprising a framing; a wheeled axle; outside journals for said axle, supporting a portion of said framing; another wheeled axle; inside journals for said other wheeled axle supporting another portion of said framing; and power cylinders carried by said locomotive, one at each side thereof, said cylinders having heads disposed in line with but distant from said outside journals and adjacent and outwardly from the wheels of said inside journal axle, whereby a free space is provided in front of and adjacent said heads to permit said heads to be removed.

3. A locomotive comprising a main frame; power cylinders at each side thereof carried by said locomotive at the forward portion of said frame; pistons and piston rods disposed in said cylinders; a supporting member carried by said frame between said cylinders and the front end of said frame; and a leading truck having a framing, means in engagement with said supporting member for transmitting weight of the locomotive superstructure to said truck and for permitting lateral radial relative movement between said superstructure and said truck, a wheeled axle with inside journals adjacent the forward ends of said cylinders, said framing adjacent the wheels of said axle being disposed within the space between the planes of the outer faces of said wheels, and housing said journals, to provide sufficient clear space at said ends of said cylinders to permit the cylinder heads at said ends to be removed and said pistons to be removed through said ends, and another wheeled axle with outside journals, said framing extending laterally outward beyond said wheels of said outside journal axle, housing said outside journals, and in line with said cylinders, said outside journal axle being disposed relative to said cylinders so that said extending frame will not interfere with the removal of said cylinder heads and said pistons.

4. A railway vehicle truck comprising three spaced wheeled axles; a frame supported on two of said axles, said two axles having outside journals, one of said two axles being the intermediate axle, said frame having two side members housing the journals of said two axles and supported thereby, a cross member connecting said side members between said two axles, and upwardly directed bearing faces at the intersections of the vertical planes of said cross member and said side members; a second frame, housing at one end thereof, the journals of the third of said axles and supported at said end thereby, said last mentioned journals being inside journals, said second frame having at its opposite end a cross member spaced above and pivoted to said first mentioned cross member, and provided with downwardly directed bearing faces slidably engaging said upwardly directed bearing faces and supported thereby; and a center bearing carried by said second frame between the wheels of said intermediate axle providing a pivotal support for the superstructure of said vehicle, said pivotal support and said bearing faces cooperating to transmit weight of said superstructure to said side members.

5. A railway vehicle truck comprising three spaced wheeled axles; a frame supported on two of said axles, said two axles having outside journals, one of said two axles being the intermediate axle, said frame having two side members housing the journals of said two axles and supported thereby, a bolster flexibly connecting said side members between said two axles, having upwardly directed bearing faces at the intersections of the vertical planes of said bolster and said side members; a second frame, housing at one end thereof, the journals of the third of said axles and supported at said end thereby, said last mentioned journals being inside journals, said second frame having at its opposite end a cross member spaced above and pivoted to said bolster and provided with downwardly directed bearing faces slidably engaging said upwardly directed bearing faces and supported thereby; and a center bearing carried by said second frame between the wheels of said intermediate axle providing a pivotal support for the superstructure of said vehicle, said pivotal support and said bearing faces cooperating to transmit weight of said superstructure to said side members.

6. A railway vehicle truck comprising three spaced wheeled axles; a frame supported on two of said axles, said two axles having outside journals, one of said two axles being the intermediate axle, said frame having two side members housing the journals of said two axles and supported thereby, a cross member connecting said side members between said two axles, and upwardly directed bearing faces at the intersections of the vertical planes of said cross member and said side members; a second frame, housing at one end thereof, the journals of the third of said axles and supported at said end thereby, said last mentioned journals being inside journals, said second frame having at its opposite end a cross member spaced above and having pivotal connection with said first mentioned cross member, and provided with downwardly directed bearing faces slidably engaging said upwardly directed bearing faces and supported thereby, said bearing faces and said inside journals providing a four point support for said second frame; a center plate-pin connection for the superstructure of said vehicle carried by said second frame between the wheels of said intermediate axle and between said pivotal connection and said third axle; and a lateral motion device between said center plate-pin connection and said second frame permitting limited lateral movement of said center plate-pin connection relative to said second frame within the bounds of said four points of support.

JAMES G. BLUNT.